Patented Nov. 26, 1946

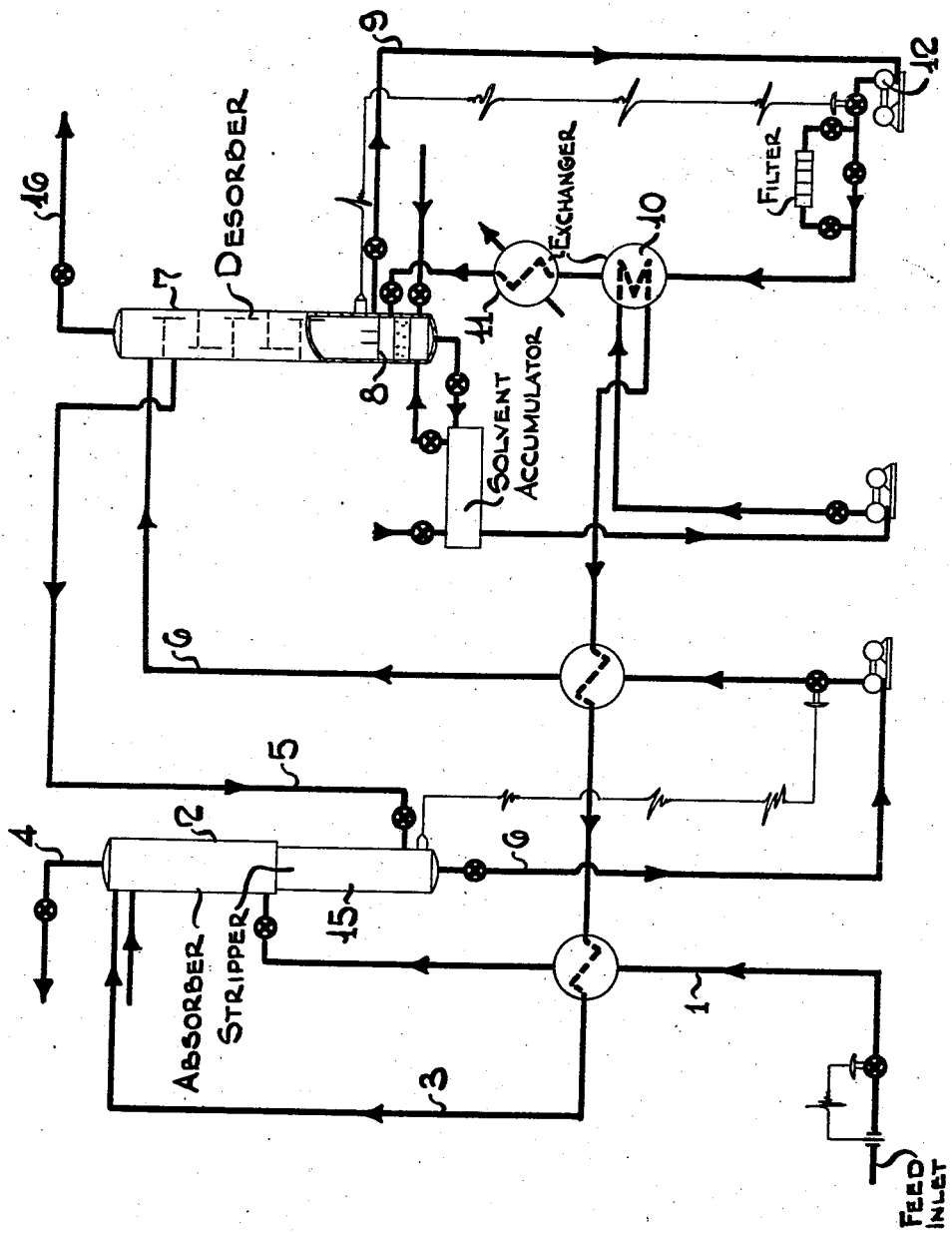

2,411,588

UNITED STATES PATENT OFFICE 2,411,588

CONCENTRATION OF DIOLEFINS

John W. Packie, Green Village, and William S. Craft, Elizabeth, N. J., assignors to Standard Oil Development Company, a corporation of Delaware Application December 16, 1944, Serial No. 568,498

10 Claims. (Cl. 260—681.5)

This invention relates to improvements in the separation and concentration of diolefins from mixtures of saturated and unsaturated hydrocarbons containing diolefins and relates particularly to the separation and concentration of butadiene by the use of a cuprous salt solution.

Organic products, obtained on cracking petroleum, brown coal, brown coal tar, synthetic paraffins and the like in the presence or absence of additional gas or vapors such as steam, hydrogen, nitrogen, carbon dioxide and the like, frequently contain both olefins and diolefins that are gaseous at ordinary temperatures and pressures. It is very difficult to separate the gaseous product into its component parts even by refrigeration as the boiling points of the said olefins and diolefins lie very close, for example, in the case of butene-1 and butadiene, the boiling points of which are $-6.24°$ C. and $-4.5°$ C. A method used extensively at present in the separation and concentration of the olefin or diolefin is one in which a solvent is used to extract the desired olefin or diolefin which is thereafter separated from the solvent. A solvent used extensively is an aqueous solution of ammoniacal cuprous salt. One of the difficulties encountered in using the ammoniacal cuprous salt in that the solution of either the diolefin or olefin generally contains a small fraction of other soluble ingredients. When butadiene is absorbed by ammoniacal cuprous acetate, the solution contains not only the diolefin but also a small fraction of the olefin and acetylenes.

A complication encountered is the difficulty of preparing a butadiene product sufficiently free from acetylenes to meet specifications. Since the copper solution used as the solvent has a high dissolving power for acetylenes, methyl acetylene, ethyl acetylene, and vinyl acetylene are undesirably removed along with the diolefins. For example in the case of a hydrocarbon gas containing butadiene and 0.1% of any of the acetylenes designated, a copper solution brought to equilibrium therewith at 80° F. and 25 p. s. i. a. total pressure contains 0.023 mols of dissolved acetylenes per liter of solution or about 0.1% by weight. When the rich solution is heated to release the butadiene, a large proportion of these acetylenes are released also. For the final butadiene product to meet the specification of 1000 P. P. M., it is accordingly necessary for the acetylenes released in the hot zone to be subsequently reabsorbed. Since these impurities tend to affect or impair the reaction qualities of the butadiene product, it is very desirable to produce butadiene substantially free of these acetylenes.

An object of this invention is to selectively separate the less soluble olefins from an ammoniacal cuprous salt solution containing olefins and diolefins. Another object of this invention is to separate diolefins without a substantial loss of ammonia from the solution. A further object of this invention is to obtain a diolefin product low in acetylene content. These and other objects of the invention will be clearly understood upon reading the following description with reference to the accompanying drawing showing a flow sheet of the process.

Referring to the drawing, hydrocarbon feed vapors consisting of olefins and diolefins plus some other minor impurities enter extractor 2 through line 1. This tower contains either bubble plates or packed sections and operates at about 0 pounds per square inch gauge and 30° F. Ammoniacal cuprous acetate solvent enters the top of extractor 2 through line 3 and flows down the tower countercurrently to the hydrocarbon vapors rising in the tower. The unabsorbed hydrocarbon vapors leave the top of extractor 2 through line 4. In this tower most of the butadiene and essentially all of the acetylenes contained in the feed are dissolved in the solvent. However, about 5 to 20% of the olefins are also dissolved in the solvent and must be selectively removed. The solvent flows from extractor 2 through stripper 15 wherein it is contacted countercurrently with recycled butadiene vapors introduced into the bottom of stripper 15 through line 5. In the stripper most of the undesired hydrocarbons (principally olefins) are stripped from the solvent thereby leaving in solution essentially pure butadiene and some dissolved acetylenes. The solvent leaves the bottom of stripper 15 through line 6 and is heated to 60–90° F. and introduced into the top of desorber 7 above the top plate. This desorber contains either bubble plates or a combination of plates and packed sections and is maintained at a pressure of 5 to 25 pounds per square inch gage, and a temperature of 60–90° F. Under these moderate conditions very little desorption of acetylenes occurs and from the top section of the desorber tower 7, essentially pure low acetylene-content butadiene vapor is withdrawn through line 16 as product. The partially desorbed solvent passes down through desorber 7 and is collected on pan 8. The solvent is withdrawn through line 9 by pump 12 and heated to 150–180° F. in heat exchanger 10 and heater 11, and is returned to the tower below pan 8. Essentially all the diolefin remaining in solution is rejected at this point together with considerable amounts of ammonia, water, and acetylene.

These vapors pass up through the tower contacting the descending cooler solvent, and most of the ammonia and water vapor and a portion of the vaporized acetylenes are reabsorbed. The unabsorbed vapors comprising butadiene and a large amount of acetylene are removed through line 5 and recycled to the stripper 15. Lean solvent leaving the bottom of desorber 7 is cooled and recycled to absorber 2 through line 3.

The extraction of butadiene from a dilute butadiene feed using ammoniacal cuprous acetate solvent involves the following three steps:

1. *Absorption.*—In this step, the desired butadiene is dissolved in the solvent along with a small amount of undesired hydrocarbons. This step may be carried out with the hydrocarbon phase in either the liquid or vapor state.

2. *Stripping.*—In this step, the undesired hydrocarbons of lower solubility than the desired product are removed from the solvent, leaving essentially pure butadiene in the solvent. The stripping may be carried out with the hydrocarbon phase in either the liquid or vapor state.

3. *Desorption.*—In this step, the pure butadiene is recovered from the solvent by vaporization therefrom.

The conditions of operation given in the above description are not to be construed as limiting but as being merely representative. For example, the temperatures and pressures given may be varied widely.

The essential feature of this invention is the two-stage desorption of butadiene from the rich solution with the withdrawal, as product, of the low acetylene-content butadiene vapor from the initial flash and the recycle of the high acetylene-content butadiene vapor from the second flash back to the stripper. This type of operation permits consistently meeting the acetylene specification on the product butadiene with a minimum number of trays in the desorber tower.

The following tabulation illustrates the magnitude of the acetylene contents of the pertinent streams when operating with a feed containing about 1000 P. P. M. of acetylenes.

*First stage low temperature desorption*

| | |
|---|---|
| Temperature °F | 80 |
| Pressure p. s. i. g | 12 |
| Acetylene content of desorbed vapor (product) P. P. M. | 500 |

*Second stage high temperature desorption*

| | |
|---|---|
| Temperature of solution introduced to second stage °F | 80 |
| Temperature of solution from reboiler °F | 165 |
| Desorption pressure p. s. i. g | 12 |
| Acetylene content of vapor from reboiler (based on hydrocarbon) P. P. M. | 10,000 |
| Acetylene content of recycle vapor to stripper P. P. M. | 1,500 |
| Acetylene content of lean solution Mols per liter | .013 |

This invention has particular application in the extraction of butadiene from a dilute butadiene feed using ammoniacal cuprous acetate solvent. However, with modification, it might be applicable to other extraction systems, using different solvents.

The nature and objects of the present invention having thus been set forth and a specific illustration of the same given, what is claimed as new and useful and desired to be secured by Letters Patent is:

1. In the extraction of butadiene from mixtures of saturated and unsaturated hydrocarbons with ammoniacal cuprous salt solution, the improvements which comprise passing the mixture of saturated and unsaturated hydrocarbons in countercurrent flow to an aqueous solution of ammoniacal cuprous salt at a temperature of about 30° F. and a pressure of 0 pounds per square inch, stripping the aqueous solution of ammoniacal cuprous salt by passing the said aqueous solution of ammoniacal cuprous salt in countercurrent flow to a mixture of butadiene and acetylene, heating the stripped ammoniacal cuprous salt solution to a temperature between 60–90° F. to release substantially pure butadiene as an overhead product, further heating the ammoniacal cuprous salt solution to a temperature ranging from 150–180° F. and recovering butadiene high in acetylene as a sidestream, and using said sidestream as the stripping medium in said stripping step.

2. In the extraction of butadienes from hydrocarbon mixtures containing both saturated and unsaturated hydrocarbons, the improvements which comprise passing a mixture of saturated and unsaturated hydrocarbons in countercurrent flow to an aqueous solution of an ammoniacal cuprous acetate, maintained at a temperature of about 30° F., stripping the aqueous solution of the ammoniacal cuprous acetate by passing it in countercurrent flow to a gas containing butadiene, heating the thus stripped aqueous solution of ammoniacal cuprous acetate to a temperature ranging from 60–90° F. to release substantially pure butadiene as an overhead product, further heating the ammoniacal cuprous acetate solution to a temperature ranging from 150–180° F. to expel substantially all of the remainder of the butadiene and using the butadiene recovered in the second step as the stripping medium in the stripping step.

3. In the extraction of diolefins from a mixture of saturated and unsaturated hydrocarbons, the improvements which comprise passing a mixture of saturated and unsaturated hydrocarbons in countercurrent flow to an aqueous solution of ammoniacal cuprous acetate solution to absorb the unsaturated hydrocarbons therein, stripping the thus enriched ammoniacal cuprous acetate solution with a diolefin-containing gas, heating the stripped ammoniacal cuprous acetate solution to a temperature ranging from 60–90° F. and at a pressure ranging from 5–25 pounds per square inch to release substantially pure diolefins as the desired product, further heating the ammoniacal cuprous acetate solution to a temperature ranging from 150–180° F. to release the remainder of the diolefins as an impure product containing acetylene and using these impure diolefins as the stripping gas in said stripping step.

4. A method for preparing substantially pure butadiene comprising contacting a hydrocarbon gas containing butadiene, acetylenes, paraffins and olefins with an aqueous solution of ammoniacal cuprous acetate solution to absorb the unsaturated hydrocarbons, stripping the olefins and any physically absorbed paraffins from said cuprous acetate solution by contacting it with a gas rich in butadiene, releasing pure butadiene from the stripped solution by heating the said solution to a temperature of 60–90° F., releasing the remainder of the butadiene and an appreciable amount of the acetylene from the solution by heating it to a temperature between 150 and 180° F. and using the acetylene-containing butadiene as the stripping medium in said stripping step.

5. A process for separating butadiene from gas mixtures comprising a major portion of butadiene, olefins and a minor portion of acetylenes comprising the steps of absorbing butadiene, olefins and acetylenes in ammoniacal cuprous acetate solution, stripping absorbed olefins from said solution by contacting it with a mixture of butadiene and acetylenes, heating said stripped solvent under conditions to release a portion of the butadiene in substantially pure form as a first overhead product and leave a bottom product comprising said solvent containing dissolved acetylenes, ammonia and the remainder of the butadiene, further heating the solvent under conditions to produce a second overhead product comprising an appreciable amount of the acetylenes, a portion of the ammonia and the remainder of the butadiene, contacting the overhead mixture of butadiene, acetylenes and ammonia with the solvent from said first heating step to reabsorb ammonia, removing as a side stream mixture the vapors, comprising butadiene and acetylenes not reabsorbed in the solution from the first heating step and using the sidestream mixture as the stripping medium in said stripping step.

6. A process for separating butadiene from gas mixtures comprising butadiene, olefins and acetylenes, comprising the steps of absorbing the butadiene, acetylenes, and olefins in a selective solvent, stripping the absorbed olefins from said selective solvent by contacting it with a mixture of butadiene and acetylenes, heating the stripped solvent under conditions to release a portion of the butadiene in substantially pure form, then heating said solvent under conditions to release the remainder of the butadiene and appreciable acetylenes and using the mixture of butadiene and acetylenes thus obtained as the stripping medium in said stripping step.

7. In a process for separating butadiene from gas mixtures comprising butadiene, saturated and unsaturated hydrocarbons the steps which comprise absorbing the butadiene and unsaturated hydrocarbons in a selective solvent, stripping the selective solvent by passing the selective solvent in countercurrent flow to a mixture of butadiene and acetylenes, heating the thus stripped solvent to release substantially pure butadiene as an overhead product, further heating the solvent to a higher temperature to release further amounts of butadiene high in acetylene as a side stream, and using said side stream as the stripping medium in said stripping step.

8. A process for separating a gaseous mixture comprising major amounts of butadiene and a component B and minor amounts of a component A, component A, butadiene and component B having vapor pressures in the presence of a selective solvent which contains a component C increasing in the order named, comprising the steps of absorbing component A, butadiene and component B in said selective solvent containing component C having a vapor pressure lower than the vapor pressures of component A, butadiene and component B to produce an enriched solvent, stripping component B from said enriched solvent by contacting it with a mixture of component A and butadiene, heating said stripped solvent under conditions to produce a first overhead vapor rich in butadiene and leave a first bottoms product comprising said solvent containing dissolved components A and C and the remainder of the butadiene, further heating the solvent under conditions to produce a second overhead product comprising an appreciable amount of component A, a portion of component C and the remainder of the butadiene, contacting the mixture of components A and C and butadiene with said solvent from said first heating step to reabsorb component C, removing a side stream mixture comprising component A and butadiene not reabsorbed in the solution from said first heating step and using said mixture of component A and butadiene as the stripping medium in said stripping step.

9. A process for separating a gaseous mixture comprising butadiene and components A and B, component A, butadiene and component B having vapor pressures in the presence of a selective solvent increasing in the order named, comprising the steps of absorbing components A and B and butadiene in said selective solvent to produce an enriched solvent, stripping component B from said enriched solvent by contacting it with a mixture of butadiene and component A, heating the stripped solvent under conditions to release a portion of the butadiene in substantially pure form, and then heating said solvent under conditions to release the remainder of the butadiene and an appreciable amount of component A and using the mixture of butadiene and component A thus obtained as the stripping medium in said stripping step.

10. A process for separating a diolefin from gas mixtures comprising the diolefin, olefins, and acetylenes, comprising the steps of absorbing the diolefin, acetylenes, and olefins in a selective solvent, stripping the absorbed olefins from said selective solvent by contacting it with a mixture of the diolefin and acetylenes, heating the stripped solvent under conditions to release a portion of the diolefin in substantially pure form, then heating said solvent under conditions to release the remainder of the diolefin and appreciable acetylenes and using the mixture of diolefin and acetylenes thus obtained as the stripping medium in said stripping step.

JOHN W. PACKIE.
WILLIAM S. CRAFT.